Patented Feb. 18, 1936

2,031,232

UNITED STATES PATENT OFFICE 2,031,232

PROCESS FOR AGING ALCOHOLIC BEVERAGES

Erwin F. Spellmeyer, East Orange, N. J.

No Drawing. Application July 10, 1934,
Serial No. 734,509

5 Claims. (Cl. 204—26)

This invention relates, generally, to the accelerating of certain chemical reactions, and the invention has reference, more particularly, to a novel provess for accelerating the aging of alcoholic beverages including whiskies, brandies, rum, cordials and wines.

Heretofore, many attempts have been made to shorten the aging period of alcoholic beverages, which period may vary from a few months to several years, depending on the nature of the beverage and upon the results desired. These attempts have been quite generally unsuccessful owing partly to a failure of the experimenters to understand the nature of the reactions taking place during the natural aging of any particular beverage and partly to a blind willingness to try anything that gives promise of obtaining the results desired. The fact that none of these various processes have come into use to any extent has demonstrated their lack of success.

Although an enormous amount of research work has been done in the past in the study of the changes which take place in alcoholic beverages from the time the raw materials are put into appropriate containers to age till they have aged and are palatable and fit for beverage purposes, yet, even today, considerable mystery surrounds the changes which actually take place during this aging period. Also, the modern consensus of opinion seems to be that a chemical analysis of any of the aged beverages does not reveal what changes actually took place during the aging period.

I have found as the result of considerable research that whiskies, brandies, rums, wines and such contain certain fugitive substances which are present only in minute quantity and which are created, partly by the yeast during the fermentation period and partly during the aging or storage period, and it is the presence of such fugitive substances which gives the liquor its premium value over pure alcohol. The fugitive substances created during the fermentation period are largely composed of a mixture of low molecular weight esters and higher alcohols. These esters enter into chemical combinations with a part of the higher alcohols and are converted partially by transposition during the aging process to higher molecular weight esters, the latter esters serving to give aged liquor its smoothness which is absent in new liquor. Two distinct reactions evidently take place simultaneously during aging i. e. a dehydration reaction wherein acid and alcohol combine to form an ester with the consequent splitting off of water, and a transposition reaction from low molecular weight esters to high molecular weight esters, this latter reaction involving both hydration and dehydration. Also, the char of charred barrels used in aging whiskeys, brandies and such contains acid substances largely in the form of acid anhydrides which combine chemically with water present in the liquors, thereby greatly improving the flavor and aroma of the liquors.

This application is a continuation-in-part of my copending application Serial No. 595,670 for Method of accelerating chemical reactions, said method being applicable to hydration and dehydration reactions generally, whereas the present application is specifically concerned with the acceleration of the aging of alcoholic beverages.

The principal object of the present invention is to provide a novel process for aging alcoholic beverages which process reduces the period of aging from months or years to days, thereby effecting an enormous saving in storage and capital expenses and eliminating large losses of liquor through evaporation.

Another object of the present invention lies in the provision of a novel process of the above character which employs alternating current in conjunction with certain catalysts common to the liquors for greatly speeding up the completion of the aging process, thereby obtaining in a few days the aroma, flavor and taste heretofore often requiring a number of years of aging to obtain.

Other objects of this invention will appear as the description proceeds.

Raw distillate for making whiskey, brandy and other alcoholic beverages contain relatively small percentages of acid, the amount of acidity generally varying from neutral to about 25 milligrams of acid per 100 c. c. of 100 proof material. This acid content of the distillate profoundly affects the aging speed when the distillate is put into a charred barrel and allowed to age in the natural way. The action of the acid content is two fold since it not only increases the solvent action of those constituents in the char of the barrel which are capable of being dissolved in an alcohol-water mixture but it also serves as a catalyst in the formation of esters.

The amount of acid normally present in raw distillates, however, is insufficient to speed up the aging evidenced by the long period required in natural aging. When additional acid is added, the process of aging is speeded up somewhat but nevertheless a relatively long time is still required. Furthermore, the amount of acid which may be added is strictly limited since the presence of too much acid makes the aged liquor unpalatable and also exceeds the amount allowed by the U. S. Pharmacopeia and pure food laws, so that the addition of acid alone does not speed up the aging process sufficiently to make the same worth while.

I have discovered that by adding a relatively small percentage of a suitable acid to the raw distillate, for example, acetic acid, and placing the distillate, in a container normally used in natural aging, such as a charred barrel, and then passing alternating current through the mixture for from one day to about two weeks, depending on the results desired, the temperature of the distillate being not allowed to rise above 150° F., I obtain aged liquor having all the flavor, aroma and smoothness possessed by naturally aged liquor. All the chemical phenomena which occur during the long natural aging process are produced in a very short period of time by using my process, the alternating current acting in conjunction with the acid catalyst to enormously speed up the aging process.

In carrying out this invention I preferably employ the same type of container as is generally used in aging the liquor in question. For example, when treating whiskey, brandy, rum and the like I use a charred barrel and when treating wines and the like I use an uncharred barrel. I bore holes in the ends of the barrel (preferably but one hole in each end) and insert electrodes into each of the holes so that these electrodes will project about one inch into the interior of the barrel. These electrodes are preferably made of carbon although I may use plated metal electrodes such as chromium, platinum or iridium plated poles. The electrodes must fit snugly within the holes to prevent breakage and preferably, bushings, as of insulating material, surround the electrodes within the holes so as to better secure a liquid tight joint between the electrodes and the barrel ends.

I then fill the barrel with the raw distillate to be treated, the said distillate having previously had its acidity adjusted to give the maximum efficiency of which the process is capable. This acid or catalyst adjustment is of vital importance as it not only has a very definite effect on the speed of the reactions which take place by giving the liquid the necessary electrical conductivity, but also controls the kind of changes which take place. Certain very desirable flavor and aroma characteristics will not develop with sufficient speed when the acidity is too low.

The acid catalysts which I use are exactly the same acids that are present in lesser or greater degree in the raw liquors themselves. Generally these acids are not present in sufficient amount in most raw liquors, except in wines, to do much good. In the case of whiskey, brandy, rum and the like I usually find it necessary to add between 25 to 50 milligrams of acid per 100 c. c. of 100 proof. The quantity of acid, such as acetic acid, thus added is well within the limits of the U. S. P. requirements. When treating apple brandy I may use acetic or malic acid. When treating wines I use either acetic acid, tartaric acid or other acids which are natural to wine, the quantity added being generally substantially the same as that added to hard liquors. I do not confine myself to the quantity range of acid above mentioned, since more acid may be used and still keep within the pure food or U. S. P. requirements, although the range mentioned, namely 25 to 50 milligrams per 100 c. c. of 100 proof has been found most satisfactory in practice.

After the barrel or other container has been filled with the liquid material to be treated, I connect the two leads from an alternating current source of supply to the two electrodes, and pass current through the barrel or container contents for from one day to three weeks depending on the taste, flavor and aroma desired in the finished product. The magnitude of the voltage and current supplied also vastly effects the properties of the finished product. I have found that a current of from 50 to 500 milliamperes supplied at a voltage of from 110 to 1100 volts depending on the size of the container and the distance the electrodes are apart about covers the range although I cannot confine myself to either amperage or current. The temperature of the liquor during treatment should in no event exceed 150° F. and preferably should not go over 130° F. although temperatures below 100° F. are most desirable.

As a specific example of the process, I treated a gallon of new raw rye whiskey distillate which was water white. I determined the acidity by volumetric titration, which was found to be 15 milligrams of acid, calculated as acetic acid per 100 c. c. of distillate, the latter being 102 proof. Twenty-five milligrams of acetic acid per 100 c. c. of 102 proof were added and the liquid put into a charred barrel having the electrodes in the ends thereof. Alternating current at 220 volts was applied to the electrodes, thereby setting up a current through the liquid of between .1 to .2 amperes, which current was allowed to run for three days, the temperature of the liquid during this time being between 90° and 100° F. Some heat is generated owing to the passage of the current through the liquid, thereby tending to raise the temperature of the material treated, but it is desirable to keep the temperature low in order to conserve the highly volatile constituents of the liquor.

At the end of the three day run the liquid was found to have the characteristic color, flavor and aroma of naturally aged whiskey. The ester value of the raw distillate was 17.4 milligrams of esters per 100 c. c. of 102 proof and in the finished product was 51 milligrams per 100 c. c. of 102 proof and the acidity had doubled. The increase in acidity was due to the formation of tannic, gallo-tannic and similar acids derived from the barrel char, which acids enhance the flavor and aroma of the whiskey.

The process of the present invention is equally applicable to wines and cordials. Though the principle of operation is the same, the conditions of operation are somewhat changed because of the difference of the composition of wines as compared with whiskeys and other distillates: The total acidity of wines when raw varies between 0.4 to 1.5% and the volatile acidity varies between 0.05 and 0.15%. This acidity is due to the presence of acetic, tartaric, lactic and other organic acids. Of these acids, only acetic has any effect on the aging and soundness of the wine. When the quantity of acetic acid is too low the wine ages very slowly and when the quantity is too high the wine becomes unsound. Most wines, due to their being made commercially by professionals, contain but little acetic acid which accounts partly for the slow aging of the wines, i. e. about five years or more.

When a little acetic acid is added to such wine and the latter is placed in an uncharred barrel and subjected to an alternating current for a period of three to six days, the wine ages very rapidly, the effect of the process being the same as in the aging of whiskey, etc. Because of the high conductivity of wines (due to the high acid content and also to the presence of salts) the amount of current required is low i. e. .1 to .2 amperes when between 30 to 40 volts is applied to the barrel electrodes.

I do not intend to confine myself to the use of acetic acid, in the aging of distillates and wines since any acid natural to the material being treated may be used, though acetic acid has been found most desirable in the majority of tests that have been run. I may use tartaric acid, malic acid, succinic acid and also acetic acid derivatives, although these catalysts are not as efficient as acetic acid, and hence require more time to produce the same results. Acids common in the char may also be used with distillates to be aged in charred barrels, i. e. tannic, gallo-tannic, and such.

In some instances the raw liquor will contain enough acid to effectively carry on the process of this invention without adding additional acid catalyst. Also, by properly controlling the fermentation process, the acid content of the raw liquor may be brought up to the desired percentage for carrying on the process without the addition of additional acetic or other acid.

I claim:

1. The method of rapidly aging alcoholic liquors, which method comprises adding an acid catalyst comprising one of the following acids, namely, acetic, tartaric, malic, succinic, tannic and gallo-tannic to the liquor and passing alternating current through the same for a relatively short period.

2. The method of rapidly aging alcoholic liquors, which method comprises adding an acid catalyst comprising one of the following acids, namely, acetic, tartaric, malic, succinic, tannic and gallo-tannic to the liquor and passing alternating current through the same for a relatively short period, the temperature of the liquor being kept below 150° F. during the aging period.

3. The method of rapidly aging alcoholic liquors, which method comprises adding a small quantity of acetic acid to the raw liquor and passing a relatively small quantity of alternating current through the same for a relatively short period.

4. The method of rapidly aging alcoholic distillates, which method comprises adding a small quantity of an acid catalyst comprising one of the following acids, namely, acetic, tartaric, malic, succinic, tannic and gallo-tannic to the distillate, placing the same in a charred container and passing a relatively small alternating current therethrough for a period not exceeding three weeks.

5. The method of rapidly aging alcoholic distillates, which method comprises adding from 25 to 50 milligrams of acid catalyst comprising one of the following acids, namely, acetic, tartaric, malic, succinic, tannic and gallo-tannic to each 100 c. c. of 100 proof distillate, placing the same in a charred barrel and passing less than one ampere of alternating current through the liquid for a period of from two days to three weeks.

ERWIN F. SPELLMEYER.